(12) United States Patent
Jude et al.

(10) Patent No.: US 9,311,060 B2
(45) Date of Patent: Apr. 12, 2016

(54) METHODS AND SYSTEMS FOR DEFINING SLICES

(75) Inventors: Eugene Jude, Bangalore (IN); Anant Gilra, Bangalore (IN); S. Monikandan, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 806 days.

(21) Appl. No.: 12/486,914

(22) Filed: Jun. 18, 2009

(65) Prior Publication Data

US 2014/0289651 A1    Sep. 25, 2014

(51) Int. Cl.
*G06F 3/0481* (2013.01)
*G06F 9/44* (2006.01)

(52) U.S. Cl.
CPC .......................................... *G06F 8/34* (2013.01)

(58) Field of Classification Search
CPC ..................................................... G06F 3/0481
USPC ........................................................ 715/764
See application file for complete search history.

(56) References Cited

U.S. PATENT DOCUMENTS

| | | | | |
|---|---|---|---|---|
| 6,230,174 B1* | 5/2001 | Berger | ................ | G06F 17/2247 382/173 |
| 6,964,017 B1* | 11/2005 | Meisner | .............. | G06F 17/2247 715/205 |
| 7,042,450 B1* | 5/2006 | Edgin | ................. | G06F 3/04845 345/420 |
| 7,941,748 B1* | 5/2011 | Sundermeyer | ...... | G06F 17/3089 707/627 |
| 2005/0108080 A1* | 5/2005 | Peterson | ................ | G06Q 40/08 705/7.28 |
| 2007/0109261 A1* | 5/2007 | Omi | .................... | G06F 3/04895 345/156 |
| 2008/0077879 A1* | 3/2008 | Black | .................... | G06F 9/4443 715/784 |
| 2012/0265802 A1* | 10/2012 | Shen | ....................... | H04L 67/02 709/203 |
| 2014/0286578 A1* | 9/2014 | Phillips | ............ | G06F 17/30905 382/199 |
| 2014/0289651 A1* | 9/2014 | Jude | ......................... | G06F 8/34 715/762 |

OTHER PUBLICATIONS

John Wylie, Export CSS painlessly from website comps in Fireworks (Published on Oct. 22, 2007, available at <http://www.adobe.com/devnet/fireworks/articles/smart_css.html>.*
Generating HTML and CSS using Visual Studio 2008 manufactured by Microsoft, released on Nov. 19, 2007, 19 pages. Meisner et al., U.S. Pat. No. 6,964,017—Teaches converting slices to HTML and Javascript to create rollover effects in web page.*
U.S. Appl. No. 11/551,962 by Musselman et al. (unpublished).*

(Continued)

*Primary Examiner* — Reza Nabi
(74) *Attorney, Agent, or Firm* — Kilpatrick Townsend & Stockton LLP

(57) ABSTRACT

A web development, application development, or other tool can be enhanced by configuring the tool to support an overlay for defining a plurality of regions (i.e. slices) simultaneously. Embodiments include providing, via a computing apparatus, a graphical user interface comprising an overlay over the area of a visual element, the graphical user interface configured to define from one to nine adjustable slices, with each slice corresponding to a respective region or component of the visual element. The method can comprise associating a default repetition behavior with each slice based on its relative position in the overlay and receiving input via the overly and adjusting a characteristic of at least one slice, the adjusted characteristic comprising a size or position of the slice. The default and/or adjusted characteristics can be used to generate HTML, CSS, and/or other code for providing the desired scaling behavior for the visual component.

15 Claims, 8 Drawing Sheets

(56) References Cited

OTHER PUBLICATIONS

John Wylie, Export CSS painlessly from website comps in Fireworks (Published on Oct. 22, 2007, available at <http://www.adobe.com/devnet/fireworks/articles/smart css.html>.*

Generating HTML and CSS using Visual Studio 2008 manufactured by Microsoft, released on Nov. 19, 2007, 19 pages.*

"What's New in Flash 8", by Lodestone Digital, LLC, Oct. 16, 2005.

Douglas Bowman, Sliding Doors of CSS, Oct. 20, 2003, available at http://www.alistapart.com/articles/slidingdoors/ (last accessed May 17, 2009).

John Wylie, Export CSS painlessly from website comps in Fireworks, Oct. 22, 2007, available at http://www.adobe.com/devnet/fireworks/articles/smart_css.html (last accessed May 17, 2009).

Office Action mailed Jan. 27, 2009 in U.S. Appl. No. 11/551,962.

\* cited by examiner

METHODS AND SYSTEMS FOR DEFINING SLICES

TECHNICAL FIELD

The disclosure below generally relates to development interfaces, particularly interfaces for defining behavior of subcomponents of a visual element.

BACKGROUND

Nested tables or DIV elements in hypertext markup language (HTML) and/or cascading style sheets (CSS) can be used to render a skin of visual element such as a panel, accordion, or the like that is dynamically resizable. To do so, the skin is broken into multiple images or other visual elements which are associated with td/tr/div tags. Then, appropriate syntax is used to define which areas in the visual element are non-repeating, and for each repeating areas of the visual element, to define width/height over which it should repeat and the direction of repetition. This is sometimes referred to in the art as defining "slices." However, defining the extent of the images and desired behavior regarding repetition can be a tedious task.

SUMMARY

Development of web pages, user interface elements, and other components that may be formed by repeating various visual components can be facilitated by methods and systems configured in accordance with the present subject matter. For example, existing capabilities of a web development, application development, or other tool can be enhanced by configuring the tool to support an overlay for defining a plurality of regions (i.e. slices) simultaneously.

Embodiments include providing, via a computing apparatus, a graphical user interface comprising an overlay over the area of a visual element, the graphical user interface configured to define one to nine adjustable slices, with each slice corresponding to a respective region or component of the visual element. The method can comprise associating a default repetition behavior with each region based on its slice's relative position in the overlay and receiving input via the overly and adjusting a characteristic of at least one slice, the adjusted characteristic comprising a size or position of the slice Based on the default behavior and/or adjusted characteristic(s), data can be stored identifying regions of the visual element and corresponding repetition behavior for the respective regions of the visual element based on the characteristics of the respective slices of the overlay.

The method can comprise generating code for providing a desired scaling behavior for the visual element based on the default and/or adjusted characteristics, with the code providing, for each respective region of the visual element, repetition behavior associated with the corresponding region.

In some embodiments, the graphical user interface defines a plurality of lines extending at least horizontally or vertically across the area of the visual element, with each slice bordered by at least two of the plurality of lines. The size of at least one slice is adjustable by adjusting the position of the plurality of lines bordering the slice. In some embodiments, the lines are indicated using a first visual effect when bordering a slice and a second visual effect when not bordering a slice, and selection of a line not bordering a slice adjusts the size of all slices bordered by the line. As another example, a slice may be repositionable by clicking and dragging within the slice, while selection and dragging of an area between the plurality of lines but not corresponding to a slice may adjust the position of all slices bordered by the plurality of lines.

Embodiments include computing systems and computer-readable media comprising program code for providing aspects of the present subject matter. Embodiments in accordance with aspects of the present subject matter may enhance the development experience and allow for rapid and straightforward use of repeating components in an expandable visual element.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

As was noted above, development of web pages, user interface elements, and other components that may be formed by repeating various visual components can be facilitated by methods and systems configured in accordance with the present subject matter. For example, existing capabilities of a web development, application development, or other tool can be enhanced by configuring the tool to support user interfaces as discussed in the examples below.

Figure 1:
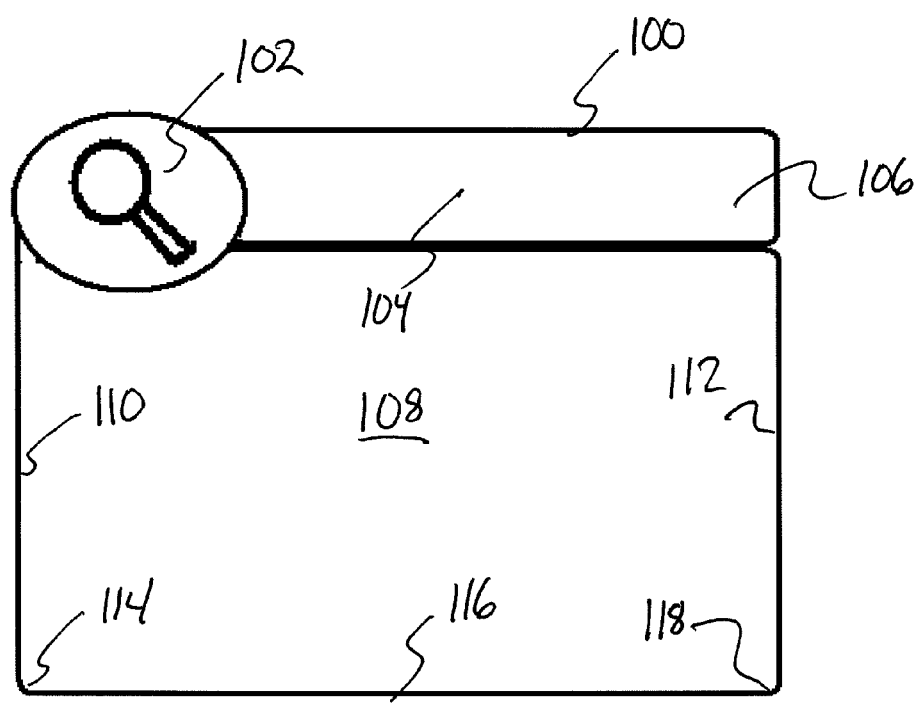
FIG. 1 is a diagram illustrating a visual element which may, for example, comprise a page fragment, component skin, or other interface element.

FIG. 1 is a diagram illustrating a visual element 100 which may, for example, comprise a page fragment, component skin, or other interface element. Visual element 100 includes a plurality of slices/areas 102, 104, 160, 108, 110, 112, 114, 116, and 118. For instance, element 100 features a top toolbar including an icon in top left area 102, a top middle body 104, and a top right area 106. Main area 108 at the center of visual element 100 may, for instance, be used to provide text or other content via visual element 100.

Visual element 100 further includes left middle border area 110 and right middle border area 112 to frame main area 108. Element 100 further includes bottom left corner area 114, bottom middle 116, and bottom right corner 118.

Visual element 100 may be a component that is to be horizontally and/or vertically expanded when used—for instance, visual element 100 may be a skin for a popup window or template for a web page presented in a browser window that can be resized by a user. Visual element 100 may be based on one or more suitable graphics files—for example, a designer may generate an image file using a vector or raster graphics editing tool to achieve a desired appearance and then code can be developed so that visual element with that appearance exhibits appropriate expansion behavior.

In order for element 100 to be vertically expandable various techniques may be employed. For example, visual element 100 may be generated by hypertext markup language (HTML) code using nested table elements and/or a cascading style sheet (CSS) to provide repetition behavior.

For visual element 100 to be horizontally expanded, for instance, code for top middle area 104 and bottom middle area 116 can specify that the respective regions of visual element 100 are repeated as the area of visual element 100 increases in the horizontal direction. Optionally, main (middle center) area 108 can be repeated in the horizontal direction and/or vertical direction to fill in the middle region; cropping can be used if there is not an exact fit. On the other hand, to achieve a favorable appearance, regions of visual element 100 at 102, 106, 110, 112, 114, and 118 should not be repeated in the horizontal direction. Instead, middle areas 104 and 116 should fill in the space between the left and right sides of visual element 100.

For vertical expansion, regions of visual element 100 in left middle area 110 and right middle area 112 can be repeated as the area of visual element 100 increases in the vertical direction, while regions at areas 102, 104, 106, 114, 116, and 118 should not be repeated in the vertical direction. Area 108 can be repeated horizontally and/or vertically as desired and depending on what visual effects are to be provided in area 108.

The repetition behavior can be achieved by using nested tables, HTML tables, and/or by using cascading style sheets. For instance, visual element 100 can be broken into fragments corresponding to each area. The corner areas 102, 106, 114, and 116 can be associated with <div> tags or other suitable code for not repeating, while the middle regions 104, 110, 112, 116 and 108 (as appropriate) can be associated with <div> tags for repeating in the desired direction(s).

However, in accordance with aspects of the present subject matter, rather than defining a plurality of individual slices manually or one-by-one using a slice tool of an existing development application, a graphical user interface can be used to define composite slices for defining desired repetition behavior.

Figure 2:
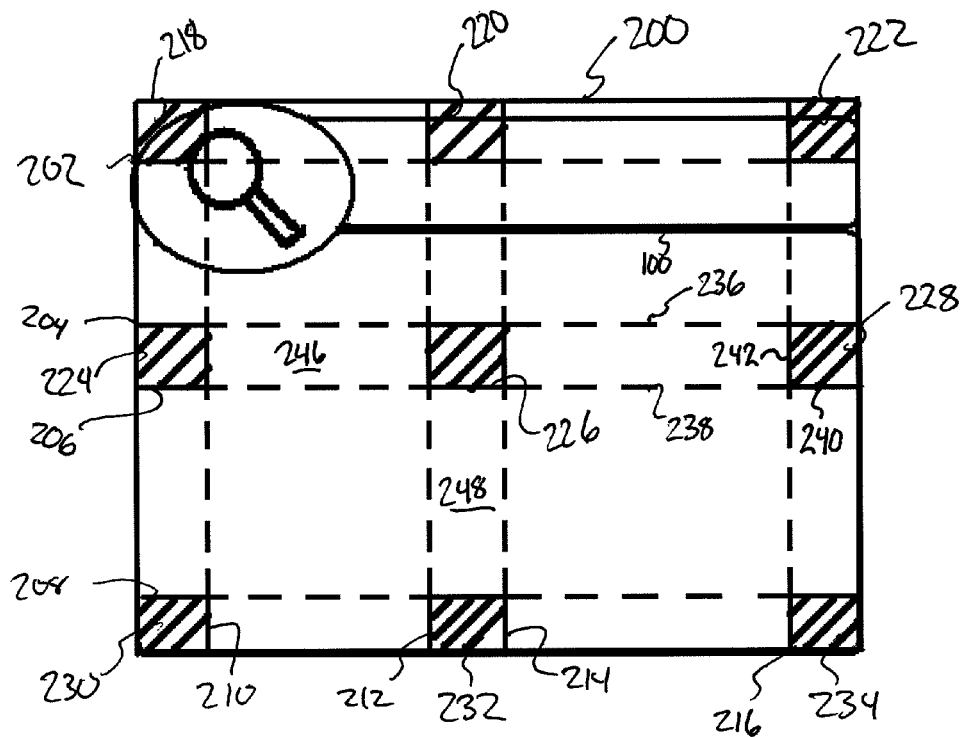
FIG. 2 illustrates a graphical user interface that can be used to define desired repetition behavior with respect to visual elements.
Figure 2:
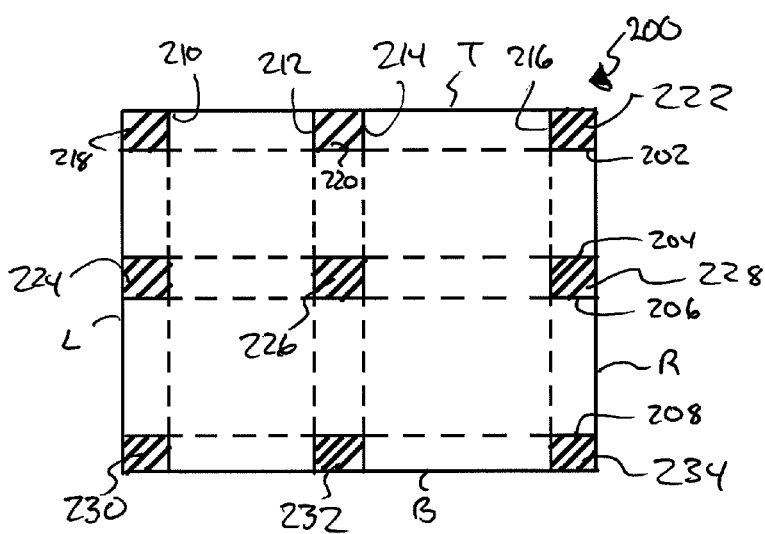

FIG. 2 illustrates an example of a graphical user interface that can be used to define desired repetition behavior with respect to visual elements. In this example, an overlay 200 is provided on a representation of visual element 100. For clarity, overlay 200 is also illustrated separately in FIG. 2. Overlay 200 includes a plurality of horizontal lines 202, 204, 206, and 208 and a plurality of vertical lines 210, 212, 214, and 216. The horizontal and vertical lines, along with top edge T, left edge L, right edge R, and bottom edge B define a plurality of slices in overlay 200. For purposes of illustration, the slices are shown using cross-hatching. In practice, the slices may be rendered as solid colors, using patterns, or semi-transparently so that the underlying regions of visual element are still perceptible.

In this example, nine rectangular slices are defined, although any suitable number of slices can be used. In some embodiments, at least one slice, but no more than nine slices, are defined. In overlay 200, a top left slice 218 is defined by the left edge of overlay 200, the top edge of overlay 200, a horizontal line 202, and vertical line 210; a top middle slice 220 is defined by the top edge of overlay 200, horizontal line 202, and vertical lines 212 and 214; a top right slice 222 is defined by the top edge of overlay 200, horizontal line 202, and the right edge of area 200.

A middle left slice 224 is defined by left edge of overlay 200, horizontal lines 204 and 206, and vertical line 210; a center slice 226 is defined by horizontal lines 204 and 206 and vertical lines 212 and 214; and a middle right slice 228 is defined by horizontal lines 204 and 206, vertical line 216, and right edge of overlay 200.

A bottom left slice 230 is defined by the left and bottom edges of overlay 200, horizontal line 208, and vertical line 210; a bottom middle slice 232 is defined by horizontal line 208, the bottom edge of overlay 200, and vertical lines 212 and 214; and a bottom right slice 234 is defined by bottom edge of overlay 200, right edge of overlay 200, vertical line 216, and horizontal line 208.

As will be noted below, overlay 200 can be used to provide input for associating one or more characteristics with each slice to define desired repetition behavior.

Figure 3A:
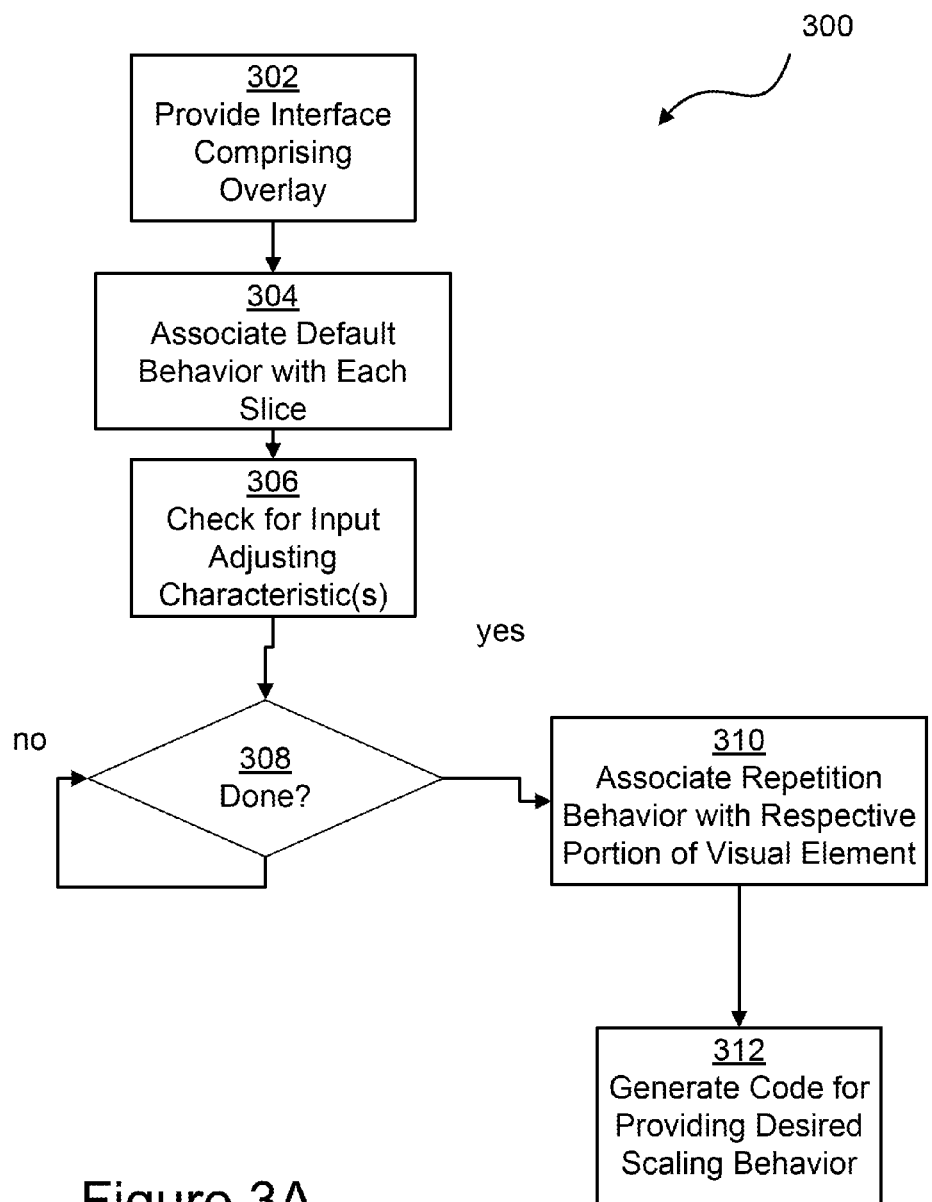
FIG. 3A is a flowchart showing steps in an exemplary method for defining repetition behavior and generating code for providing a visual element.

FIG. 3A is a flowchart showing steps in an exemplary method 300 for defining code for providing a visual element such as element 100. Block 302 represents providing an interface including an overlay. For instance, the overlay can be provided as part of a graphical user interface that includes a representation of the different regions of the visual element. The slices defined via overlay 200 can be correlated to components of visual element 100 to define which regions of visual element 100 are to be repeated and the desired repetition behavior for each slice.

Block 304 represents associating a default behavior with each slice in the interface. For example, the default behavior may depend at least in part on the number of slices in the overlay and the relative positions of the slices. For instance, if nine slices are provided as in the example of FIG. 2, then slices 202, 222, 230, and 234 (i.e. the corner slices) may be defaulted to non-repeatable, slices 220 and 232 (i.e. the top and bottom middle slices) may be repeatable horizontally but not vertically, slices 224 and 228 (i.e. the right and left middle slices) may be repeatable vertically, but not horizontally, while slice 226 may default to repeating in both directions.

The number of slices may be selectable. For instance, a menu or dialog can be provided to select a desired overlay. As will be discussed later below, in some embodiments three slices are presented, such as top, middle, and bottom, to define repeating behavior in only a horizontal or vertical direction. The middle slice may be used to define horizontal or vertical repeating, while the top and bottom slices may be used to define top and bottom border areas, title bar, etc.

At block 306, the method awaits input adjusting one or more characteristics of the slices. Characteristics include, but are not limited to, the number, size, position, and repetition behavior of slices. For example, the respective sizes of the slices may be adjusted individually or together by clicking and dragging so that slices overlay desired regions of the visual element for the repetition behavior associated with the slice.

Returning to FIG. 2, for instance, slice 218 may be resized to cover the icon of area 102 so that the entire area occupied by the icon is treated as non-repeatable. Slice 220 may be adjusted to occupy a representative slice of top middle area 104. Similar treatment can be done so that slices 222, 230, and 234 cover the respective regions of visual element 100 forming the other corners.

In some embodiments, slices bordered by a common horizontal or vertical line can be resized together. For example, a user can click on horizontal line 204 at location 236 or 238 to adjust the vertical size of slices 224, 226, and 228 together. On the other hand, a user may click on a portion of a line directly bordering a slice, such as at 240 or 242, to resize the area of a slice such as 228 individually.

In some embodiments, the overlay is presented using visual effects to indicate which portions adjust individual slices or slices in groups. For instance, as shown in FIG. 2, dotted portions of a line indicate when clicking and dragging a line resizes all slices bordered by the line, while solid portions of a line indicate where clicking and dragging the line resizes the individual slice bordering the clicked portion of the line. Other effects, such as different colors, patterns, flashing lines, etc. can be used, of course.

Another method of resizing multiple slices simultaneously may be provided by interpreting a combination of a click and key (e.g. control+click) as a command to select multiple slices. Then, dragging of the border at one slice can expand all selected slices simultaneously.

Slice position can be adjusted individually or in groups as well. As an example, if a user clicks and drags in the area of an individual slice, the slice can be positioned individually. For instance, the slice may be moved so that it overlays a visual element that is to be repeated. On the other hand, if a user clicks in an area between two lines that define the edges of a plurality of slices, the position of some or all of the slices bordered by those lines can be translated/repositioned at the same time. For example, if a user clicks and drags in area 246 shown in FIG. 2, slices 224, 226, and 228 can be moved together, while if a user clicks and drags in area 248, slices 220, 226, and 232 can be moved together.

Returning to FIG. 3A, at block 308 the method checks whether user adjustment of slice characteristics is complete. For example, a user may indicate that adjustment is complete via a "done," "save," "generate," or other suitable command, or simply by discontinuing use of the slice definition tool, which in some embodiments commits all changes. Once adjustment is complete, then at block 310 the repetition behavior for each slice is associated with a respective area in the visual element. For example, the screen coordinates for a slice can be cross-referenced with screen coordinates of the area of the visual element or a image fragment associated with that area. Data identifying the region of the visual element along with the desired repetition behavior can be stored, e.g. in memory, for later use.

Block 312 represents using the associated repetition data to generate code. Code using the proper syntax for accessing the visual elements can be generated and appropriate tags, parameters, and the like can be added to achieve the repetition behavior. Generating code may also comprise breaking the visual element into respective fragments corresponding to the slices if fragments do not already exist.

A web development or other tool that can automatically generate CSS, HTML, or other suitable code based on slice definitions may implement method 300 in order to provide a more user-friendly and rapid means for defining slices. Thus, in some embodiments, block 312 represents passing the slice definition data to other components of the web development tool and invoking the code generation capability.

Figure 3B:
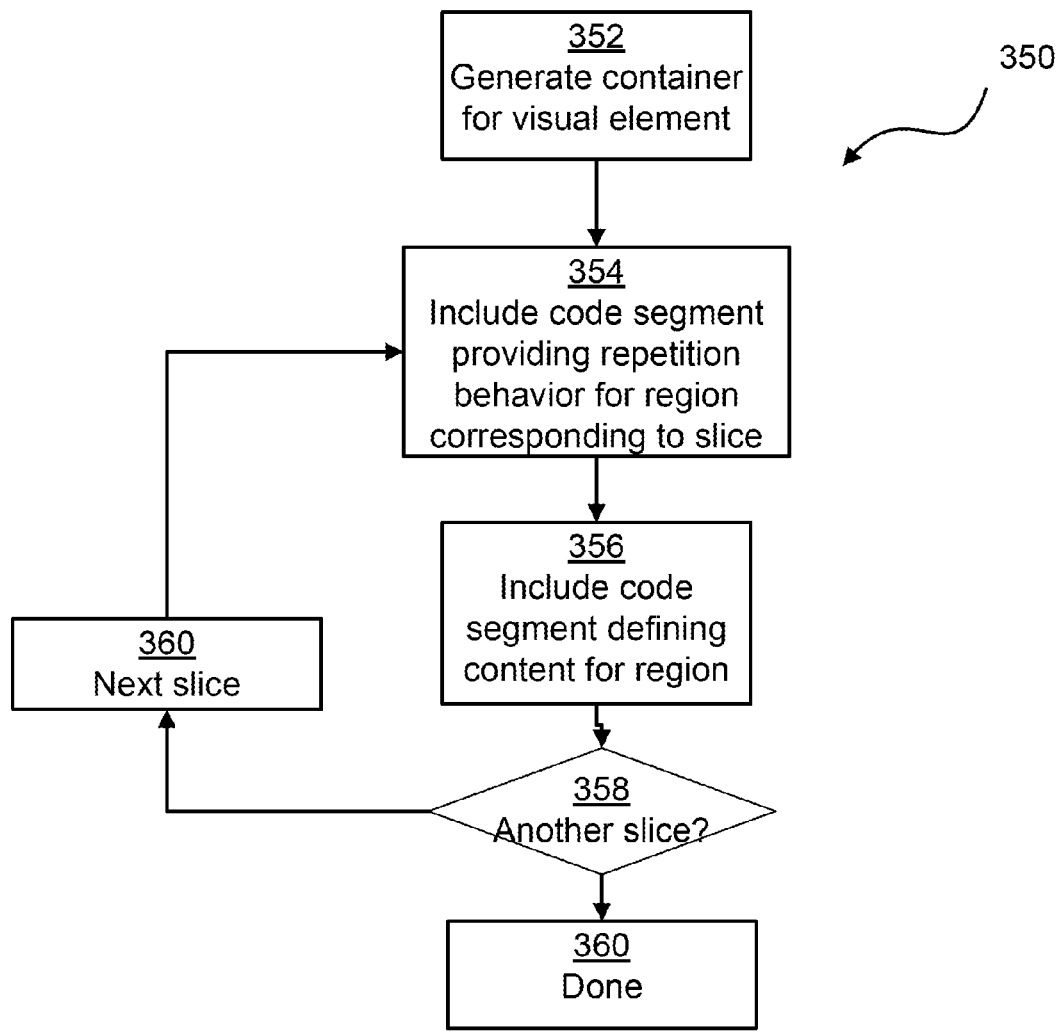
FIG. 3B is a flowchart showing steps in an exemplary method for generating code.

FIG. 3B is a flowchart showing an exemplary method 350 for generating code. For example, method 350 or another suitable code generation method may be called at block 324 of FIG. 3A. At 352, a container for the visual element is generated. For example, an HTML table may be defined. As another example, an HTML container may be defined using DIV tags with reference to a CSS definition file.

Blocks 354-560 represent stepping through the slices until a corresponding portion of the code is included for each slice. At block 354, the method includes a code segment providing repetition behavior for the region corresponding to a slice. For example, for an upper left region that is to remain fixed with no repeating, appropriate HTML code can be generated to provide a table element with a fixed width/location and specifying the fragment as a foreground image so that it does not repeat. For an upper middle portion that repeats horizontally, the art fragment can be included in a corresponding table element but set to "background" so that it repeats. For an HTML/CSS embodiment, one or more DIV tags can be defined and then appropriate CSS parameters included to fix the content in the DIV tag(s) and provide the desired background behavior (e.g., "background-repeat: repeat-y" for vertical repetition, "background-repeat: repeat-x" for horizontal repetition, etc.).

At block 356, one or more code segments defining content for the region are included. For example, an IMG tag referencing an art fragment or portion of an image for the upper left corner can be placed in the corresponding table element or in the appropriate portion within the DIV tag structure.

At block 358, the method checks for another slice. If no more slices remain, the method is done at 360—the generated code can be output and/or stored. If, at block 358, slices, remain, then at block 360 the method moves to the next slice and then includes a code segment providing the repetition behavior for the region corresponding to the next slice and associates the appropriate content with that region.

Figure 4A:
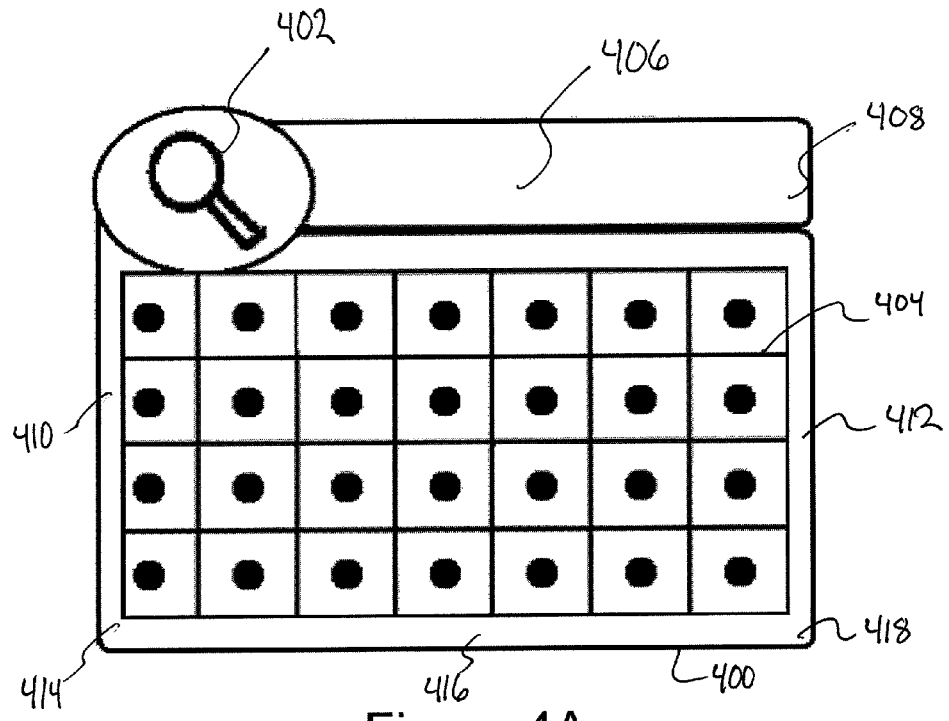
FIGS. 4A and 4B illustrate a visual element and a corresponding overlay with slices adjusted to correspond to different components of the visual element.
Figure 4B:
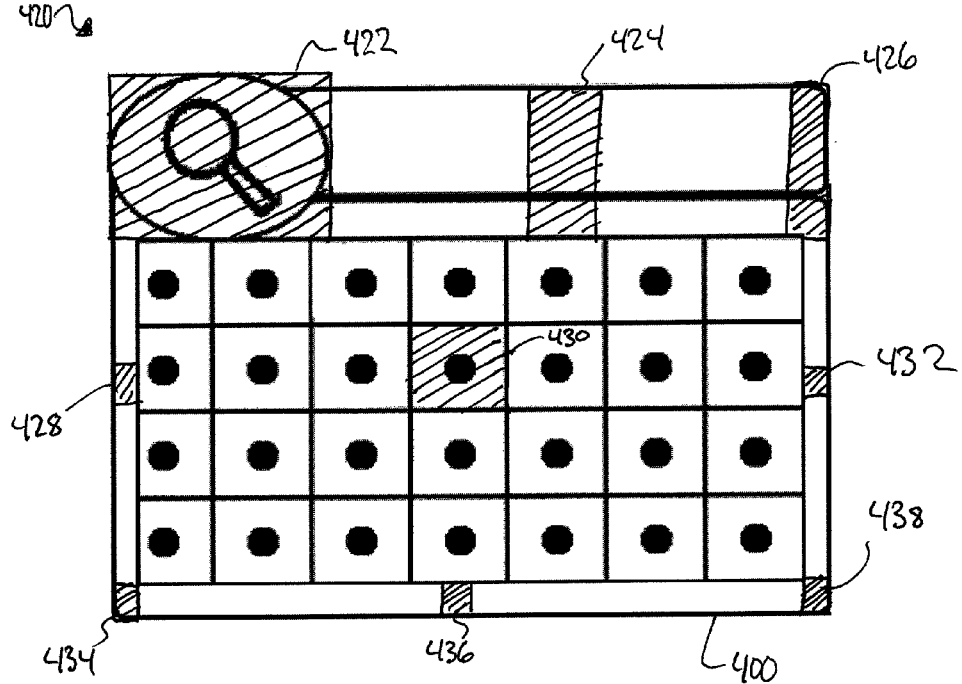

FIGS. 4A and 4B illustrate a visual element 400 and an overlay 420, respectively. In this example, visual element 400 includes upper left area 402, fill (middle center) area 404, upper middle area 406, and upper right area 408 that define a header or toolbar, middle left area 410 and middle right area 412 representing sides of the visual element, and bottom left area 414, bottom middle area 416, and bottom right area 418 that define the lower border of visual element 400. In this example, fill area 404 includes a square pattern with a dot that repeats horizontally and vertically.

FIG. 4B illustrates an overlay 420 after a user has adjusted slice characteristics. For instance, initially the overlay may be presented as in FIG. 2 and the user can click on slices to resize and reposition the slices. In this example, slice 422 in the upper left corner has been resized to correspond to the entire microscope visual component of element 400.

Slice 422 can be set to be non-repeatable or may default to that behavior since it is in the upper left corner. Upper middle slice 424 has been defined as a thin vertical slice of the toolbar/header art in area 406 and can be set (or default) to horizontal, but not vertical, repetition. Upper right slice 426 has been defined as a slightly larger slice of the rightmost end of the toolbar/header art and can be set (or default) to no repetition.

Middle left slice 428 and middle right slice 432 have each been defined as slices of border art in areas 410 and 412, respectively. The behavior of these slices can be set (or default) to vertical, but not horizontal repetition. Center slice 430 has been adjusted in size and position to correspond to a single unit of the square pattern in middle center area 404 and can default to horizontal and vertical repetition. Lower left and right slices 434 and 438 have been defined as small slices corresponding to lower corner areas 414 and 418, respectively, and can be set (or default) to no repeatability. Lower middle slice 438 is set to cover a very small slice of lower middle area 416 to provide an expandable lower border via horizontal repeatability.

FIG. 4B also illustrates an example of an overlay that does not include a plurality of vertical and horizontal lines. For instance, the lines may have initially been displayed in the overlay. However, the lines can be removed as slices are adjusted—for example, if an individual slice is adjusted, its borders will no longer correspond to a horizontal or vertical line.

Figure 5A:
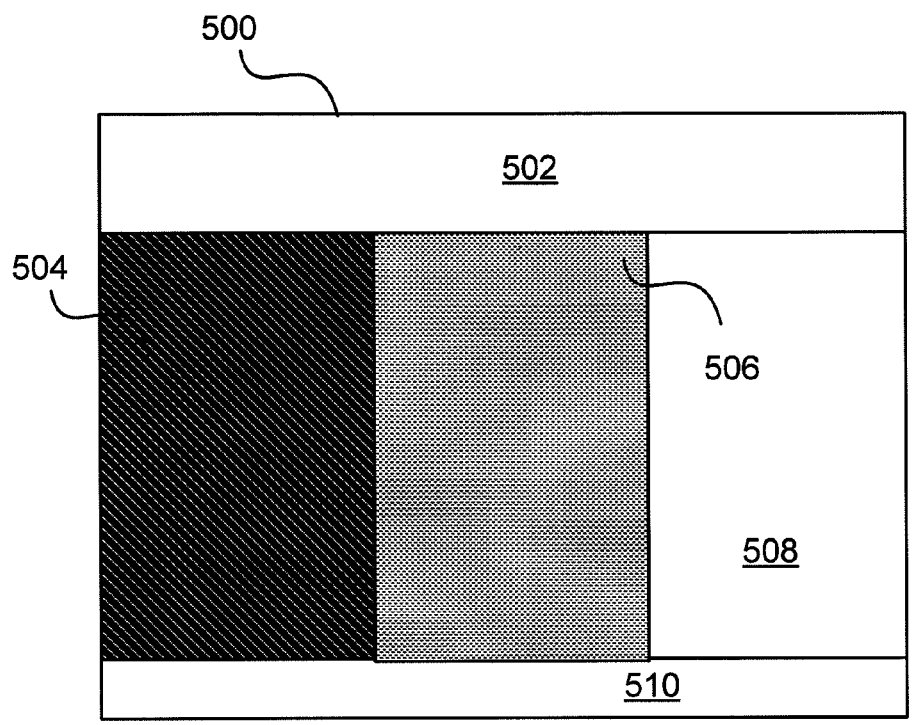
FIGS. 5A and 5B illustrate another example of a respective visual element and overlay.
Figure 5B:
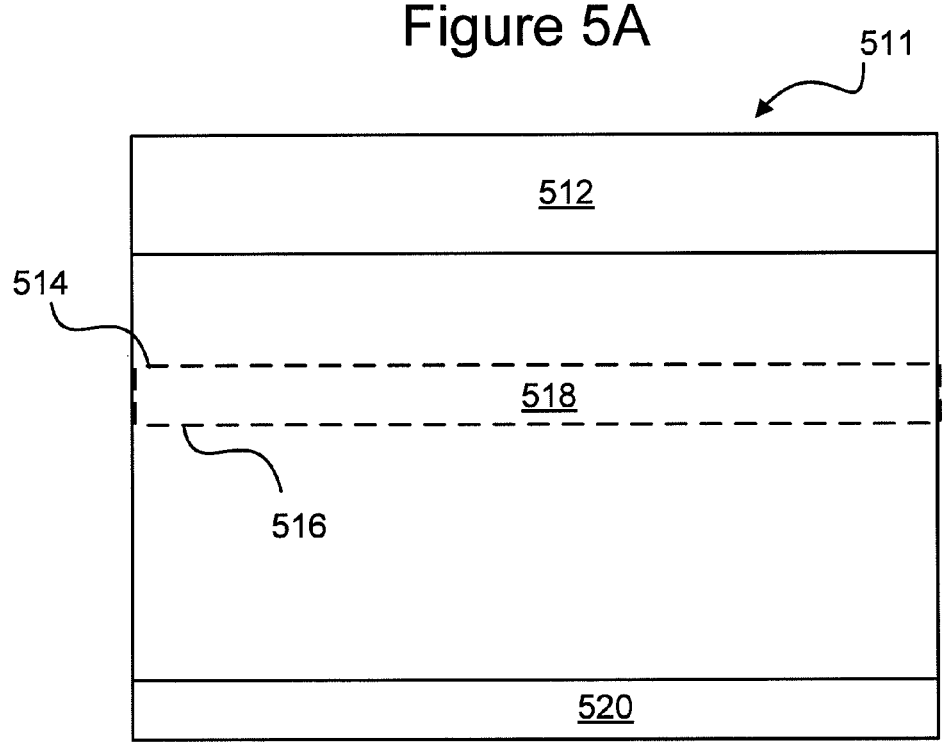

FIGS. 5A and 5B illustrate a visual element 500 and an overlay 511, respectively. In this example, only a single direction of repetition is specified since visual element 500 features a horizontal gradient. Visual element 500 includes a title/menu bar area 502, a footer 510, and a horizontal gradient illustrated by shaded areas 504, 506, and unshaded area 508.

When the visual element is vertically expanded, areas 502 and 510 should remain the same size, with the area in between expanding in size and continuing to simulate the gradient. In practice, the horizontal gradient can be simulated by a line of pixels extending horizontally across visual element 500. Since a horizontal gradient is used, the element can be expanded vertically by repeating the line of pixels, but not horizontally.

Overlay 511 features three slices 512, 518, and 520. Slice 518 is defined by a plurality of horizontal lines 514 and 516. Slice 512 can be set to correspond to area 502, slice 520 can be set to correspond to area 510, and lines 514 and/or 516 can be adjusted to correspond to a single row of pixels providing the 504-506-508 gradient effect.

In some embodiments, three slices are provided by default or in response to a selection of a desired number of slices from a menu or dialog. However, the interface may initially present an overlay comprising nine slices as shown in FIG. 2. The interface can be configured to support commands to merge slices or expand slices to cover an entire horizontal or vertical extent of a visual element. For instance, three slices may be horizontally or vertically positioned initially.

For example, slice 512 may result from double-clicking an upper middle slice in an overlay, such as by double clicking slice 220 of overlay 200, which causes the slice to toggle to covering the entire horizontal extent (i.e., from the left side to the right side) of the overlay. Slice 520 may result from toggling a lower middle slice, such as slice 232 of FIG. 2, to cover the entire horizontal extent. The toggle effect may be controlled via a modifier key (e.g., double click+"X" toggles covering the entire horizontal extent while double click+"Y" toggles covering the entire vertical extent), preference menu, or other setting.

The default repetition behavior for the region corresponding the slice can also be changed in some embodiments in response to user input. For example, if a slice is expanded to cover an entire horizontal extent, the repetition behavior can be changed to vertical repeat, but no horizontal repeat. This may be needed, for example, to simulate a horizontal gradient using one or a few lines of pixels. Similarly, if a slice is expanded to cover an entire vertical extent, the repetition behavior can be changed to horizontal, but not vertical, repeat, in order to simulate a vertical gradient.

Figure 6A:
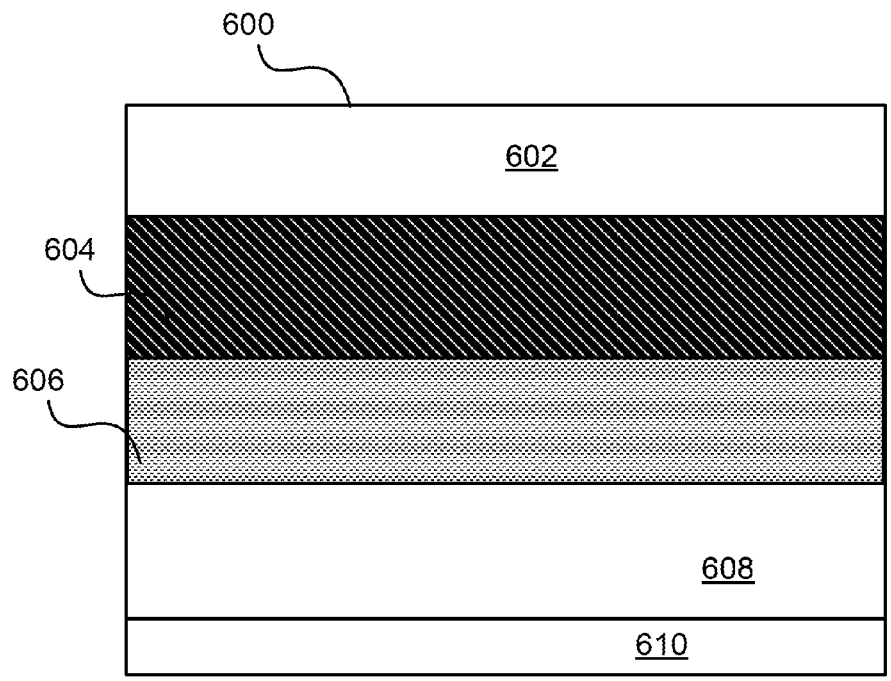
FIGS. 6A and 6B illustrate a further example of a respective visual element and overlay.
Figure 6B:
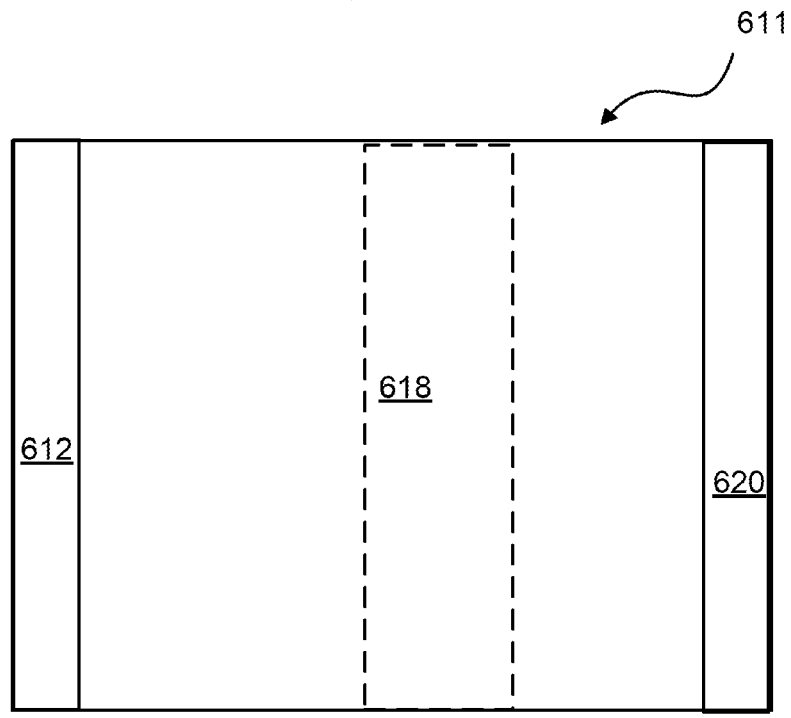

FIGS. 6A and 6B illustrate a visual element 600 and overlay 611, respectively. In this example, visual element 600 includes a title/menu area 602, a footer 610, and a vertical gradient simulated by shadings 604, 606, and 608. In practice, a vertical gradient can be simulated via a vertical line of pixels, but the resulting component should only be expandable horizontally. When the element is expanded, features at the left and right side of the element can bracket the area filled with the simulated gradient, which expands as the size of the visual element is increased.

This behavior can be specified via overlay 611. In this example, vertical lines 614 and 616 define a slice extending across the entire vertical extent (i.e. from top to bottom) of overlay 611. Thus, the line of pixels that provide the 604-606-608 gradient, as well as components that provide title/menu area 602 and footer 610, can be specified to repeat horizontally, but not vertically.

In this example, a left side slice 612 and right side slice 620 has been defined. For example, in a nine-slice overlay, the left and right-middle slices (e.g., slices 224 and 228, respectively) of FIG. 2) can be double clicked to expend to the entire vertical extent of the overlay. For this particular example, slices 612 and 620 can be made thinner since visual element 600 has only a left and right side border, or may not be needed at all. However, larger slices could be used, for example, to capture portions of a visual element 600 that includes a left-side and right-side border, rounded corners, etc.

In some embodiments, double-clicking toggles through different slice behavior. For example, double-clicking a slice may toggle between the last used (or default) slice size, a full horizontal extent for the slice, and a full vertical extent for the slice. In some embodiments, double-clicking the middle center slice toggles between the current state and a reset or default state for the all of the slices.

Overlays can support positioning slices side-by-side, but not merging the slices. For example, in FIG. 5, slice 518 may be positioned at the border of slice 512 or 520, but may still be treated as a separate (middle) slice. On the other hand, merged slices can be treated as a single slice.

The examples above included overlays with slices having default repetition behaviors based on the number and position of the slices. In some embodiments, different numbers of slices and repetition behaviors can be specified to define additional overlays for use in design tools.

Figure 7:
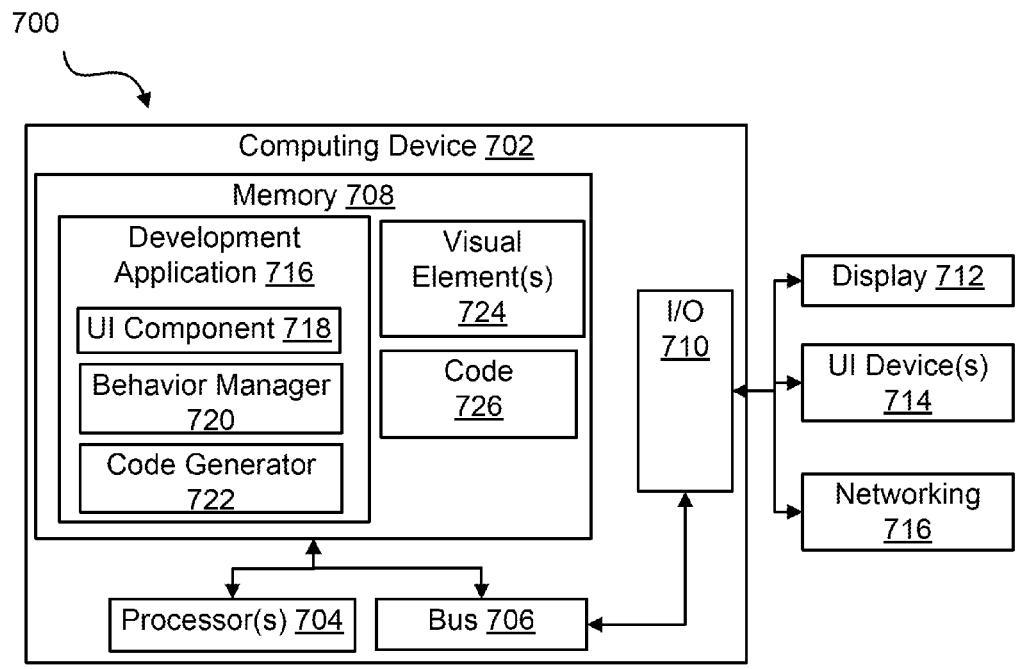
FIG. 7 is a block diagram illustrating an example of a computing system configured to support a graphical user interface for defining repetition behavior in a visual element

FIG. 7 is a block diagram illustrating an example of a computing system 700 configured to support a graphical user interface for defining repetition behavior in a visual element. In this example, computing device system 700 includes a computing device 702 comprising one or more processors 704, a bus 706, memory 708, input-output (I/O) handling components 710, a display 712, user input (UI) devices 714 (e.g., a mouse, keyboard, etc.), and one or more networking or other interfaces 716 (e.g., Ethernet, USB, etc.). Memory 708 represents one or more computer-readable media accessible by processor(s) 704.

Memory 708 embodies several program components, including a development application 716. For example, development application 716 may comprise a web development application such as Adobe® Fireworks® or Dreamweaver®, each available from Adobe Systems Inc. of San Jose, Calif. However, development application 716 may comprise another application used to generate code for visual elements.

In this example, development application 716 comprises a UI component 718 that is configured to provide a user interface for displaying visual elements and an overlay and receiving commands for the development application. Development application 716 further includes a behavior manager 720 for assigning default behaviors to slices and maintaining working files indicating slice sizes, positions, repetition behaviors, and other information used to generate code. For example, data defining slice components (e.g. art fragments or other designated regions of a visual element) and behavior can be stored in memory by behavior manager 720 or another component for use by other components in generating code.

Code generator 722 comprises one or more components or processes capable of generating CSS, HTML, or other code in response to data identifying slice components and behavior. Although shown as part of development application 716 in this example, not all embodiments of development application 716 include code generator 722. For instance, code generator 722 may be implemented as a separate application that accesses slice definition data generated by development application 716 and stored in memory.

Development application 716 can, of course, include other components such as file management components, vector and/or bitmap art editing components, page layout management components, import/export components, clipboard functionality, and the like.

Memory 708 also embodies data for one or more visual elements 724. For instance, a visual element (such as visual elements 100, 400, 500, 600 from the examples above) may be defined using a bitmap or vector graphics editing program and/or may be edited using development application 716. The various components of the visual element may be defined in a single file or in multiple files.

Memory 708 further embodies code 726 for generating the visual element with the desired repetition behavior. For instance, a user can provide input via an overlay and/or another graphical user interface to trigger code generation by development application 716 as was noted above, and the generated code can be stored in memory for later use and/or export.

Memory 708 can further embody additional components and/or data such as an operating system, runtime environment, and other applications, such as a browser or other application that can read/interpret code 726 to generate the visual element with the desired repetition behavior.

Figure 8:
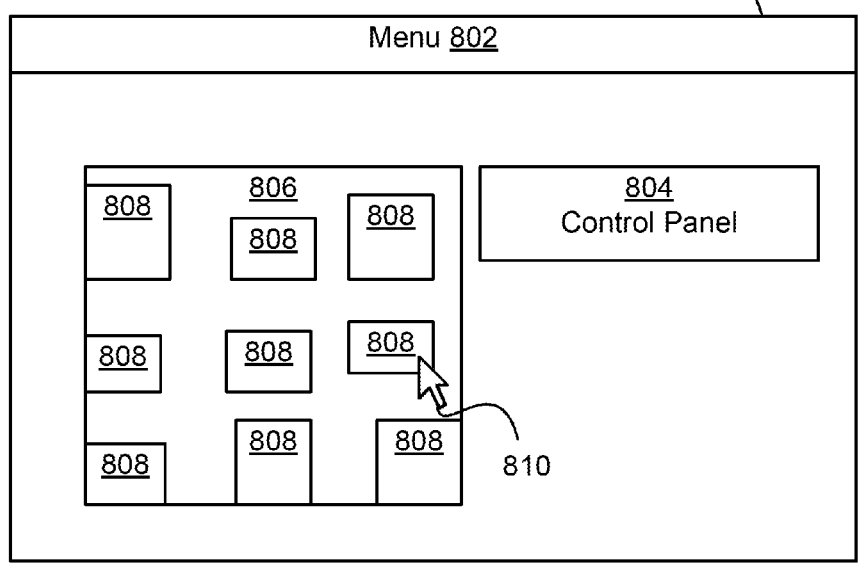
FIG. 8 is a diagram illustrating an example user interface including an overlay as part of the graphical user interface.

FIG. 8 is a diagram illustrating an example user interface 800 including an overlay as part of the graphical user interface. For example, development application 716 may generate one or more windows including a menu 802 and control panel 804. For instance, window 806 may be used to view and/or edit a visual element and, once an appropriate command is received, to provide an overlay comprising slices 808 for use in defining desired areas of repetition and repetition behavior. Control panel 804 may, for example, be used to set the number of slices and/or adjust repetition behavior. A user may click and drag using pointer 810 or another suitable indicator to reposition slices, toggle between states, change slice sizes, etc. as was noted above.

Appendix A is an example of HTML code to generate a page with an expandable container based on nested table elements. In this example, the following image files correspond to artwork fragments referenced from an "images" directory: an upper left image "table_r2_c2.gif"; upper middle image "table_r2_c6.gif"; upper right image "table_r2_c10.gif"; a middle left image "table_r4_c2.gif"; middle right image "table_r6_c11.gif"; lower left image "table_r8_c2"; lower middle image "table_r8_c7.gif"; and lower right image "table_r8_c10.gif." There is no center middle image in this example; instead, the center portion includes text that wraps as the container is resized

APPENDIX A

Repeating Container using Nested Tables

```
<!DOCTYPE html PUBLIC "-//W3C//DTD XHTML 1.0 Transitional//EN"
"http://www.w3.org/TR/xhtml1/DTD/xhtml1-transitional.dtd">
<html xmlns="http://www.w3.org/1999/xhtml">
<head>
<title>Table based</title>
<meta http-equiv="Content-Type" content="text/html; charset=UTF-8" />
</head>
<body bgcolor="#999999">
 <table width="100%" border="0" cellspacing="0" cellpadding="0">
  <tr>
   <td align="left"><img name="table_r2_c2" src="images/table_r2_c2.gif" width="110" height="110" border="0" id="table_r2_c" alt="" /></td>
   <td width="99%" background="images/table_r2_c6.gif"> </td>
   <td align="right"><img name="table_r2_c10" src="images/table_r2_c10.gif" width="43" height="110" border="0" id="table_r2_c4" alt="" /></td>
  </tr>
  <tr >
    <td colspan=3>
      <table width="100%" border="0" cellspacing="0" cellpadding="0">
       <tr>
        <td background="images/table_r4_c2.gif"><img name="table_r4_c2" src="images/table_r4_c2.gif" width="25" height="13" border="0" id="table_r4_c" alt="" /></td>
         <td width="99%"bgcolor="#FFFFFF">Lorem ipsum dolor sit amet, consectetuer
adipiscing elit. Suspendisse eget lorem. Nunc urna augue, rhoncus eu, consequat ut, imperdiet
eu, ligula. Sed consectetuer dui eu lorem. Phasellus pulvinar, neque id adipiscing vehicula, est
enim iaculis tortor, sit amet vehicula nibh eros eget lectus. Etiam tristique sapien nec enim.
```

APPENDIX A-continued

Repeating Container using Nested Tables

Donec et nunc quis urna aliquam cursus. Vivamus dapibus nibh ut tortor. Sed facilisis tempus ipsum. Phasellus sed eros. Morbi quam mi, fermentum et, lacinia pellentesque, laoreet eu, augue. Proin elementum mollis ligula. Maecenas fringilla, nisl vitae volutpat consectetuer, pede nibh sollicitudin nibh, vel hendrerit tellus nibh sit amet elit. Cras luctus. Integer laoreet feugiat leo. Suspendisse potenti. Suspendisse lobortis, nunc id ullamcorper lacinia, odio ligula pulvinar tellus, sit amet fringilla pede arcu et nunc. Nulla suscipit aliquam eros. </td>

```
        <td background="images/table_r6_c11.gif"><img name="table_r6_c11" src="images/table_r6_c11.gif" width="22" height="9" border="0" id="table_r6_c" alt="" /></td>
      </tr>
      <tr>
        <td><img name="table_r8_c2" src="images/table_r8_c2.gif" width="25" height="21" border="0" id="table_r8_c" alt="" /></td>
        <td width="99%" background="images/table_r8_c7.gif"><img name="table_r8_c7" src="images/table_r8_c7.gif" width="25" height="21" border="0" id="table_r8_c4" alt="" /></td>
        <td><img name="table_r8_c10" src="images/table_r8_c10.gif" width="22" height="21" border="0" id="table_r8_c3" alt="" /></td>
      </tr>
    </table>
   </td>
  </tr>
 </table>
</body>
</html>
```

Appendix B is an example of HTML code that references a sytlesheet entitled "style.css" and provided in Appendix C.

APPENDIX B

Repeating Container in HTML Referencing CSS

```
<!DOCTYPE html PUBLIC "-//W3C//DTD XHTML 1.0 Transitional//EN"
"http://www.w3.org/TR/xhtml1/DTD/xhtml1-transitional.dtd">
<html xmlns="http://www.w3.org/1999/xhtml">
<head>
<title></title>
<meta http-equiv="Content-Type" content="text/html; charset=iso-8859-1" />
<link href="style.css" rel="stylesheet" type="text/css" />
</head>
<body>
 <div id="wrapper1"><!-- sets background to white and creates full length leftcol-->
 <div id="wrapper2"><!-- sets background to white and creates full length rightcol-->
  <div id="maincol"><!-- begin main content area -->
   <div id="leftcol"></div><!-- end leftcol -->
   <div id="rightcol"></div><!-- end righttcol -->
   <div id="centercol">
   </div><!-- end centercol -->
   <div id="leftcol1"></div><!-- end leftcol -->
   <div id="rightcol1"></div><!-- end righttcol -->
   <div id="centercol1">Lorem ipsum dolor sit amet, consectetur adipiscing elit. Nunc nisl.
```

Maecenas consequat. Vivamus tempor pretium odio. Sed suscipit, sapien a scelerisque tempor, lorem urna cursus sapien, eu volutpat diam orci nec ipsum. Curabitur at orci non nisi enismod dapibus. Nulla accumsan enim eu felis hendrerit dignissim. Donec sed ante vitae neque gravida euismod. Quisque nec mi. Nullam ultrices ipsum consectetur enim. Nullam sed turpis quis libero consectetur tempus. In orci lorem, mollis eu, sodales eu, aliquet sit amet, urna. Sed fermentum scelerisque purus. Mauris volutpat tincidunt est. Etiam commodo dictum risus.
Etiam auctor blandit eros. Phasellus fermentum, justo vitae pellentesque vulputate, mauris nisl luctus mauris, a eleifend metus tellus vel quam. Aenean dignissim malesuada urna. Nunc erat massa, vulputate ac, blandit non, gravida elementum, justo. Aenean congue purus eget est. Donec nisi justo, cursus ac, dapibus ut, gravida eu, tortor. Nullam sed erat eget lorem faucibus imperdiet. Integer interdum quam in metus. Morbi pellentesque mauris sit amet mauris. Sed eleifend, pede a vestibulum varius, massa ipsum molestie dolor, id posuere neque tellus eu ante. Vestibulum viverra malesuada enim. Mauris sollicitudin lacinia augue. Mauris odio.

```
</div><!-- end centercol -->
   <div id="leftcol2"></div><!-- end leftcol -->
   <div id="rightcol2"></div><!-- end righttcol -->
   <div id="centercol2"></div><!-- end centercol -->
  </div><!-- end main content area -->
 </div><!-- end wrapper1 -->
</div><!-- end wrapper2 -->
</body>
</html>
```

As noted above, Appendix C is a cascading style sheet (CSS) file that provides information about the <DIV> elements defined in the HTML file of Appendix B. Particularly, the CSS file references art fragments and specifies background repetition behavior for the respective fragments. In this example, the top left, top middle, and top right portions have art fragments in an "images" directory and titled "tab_tl.jpg"; "tab_tm.jpg"; and "tab_tr.jpg" respectively. The bottom left, bottom middle, and bottom right portions have art fragments titled "tab_bl.jpg"; "tab_bm.jpg"; and "tab_br.jpg." In this example, there are no separate art fragments for the left middle, center middle, and right middle portions as the desired repetition behavior is achieved with the six fragments.

APPENDIX C

Cascading Style Sheet with Repetition Behavior

```
/* CSS Document */
body {
  background:#FFF;
  text-align:center;
  margin:20px;
  padding:0;
  font:normal 0.8em/1.2em verdana,aria,sans-serif;
  color:#666;
}
a {
  color:#FFF;
  text-decoration:none;
  border-bottom:1px dotted;
}
a:hover {
  border-bottom:1px solid;
  color:#9343B9;
}
#wrapper1 {
  position:relative;
  text-align:left;
  width:100%;
  background:#FFF ;
}
#wrapper2 {
  position:relative;
  text-align:left;
  width:100%;
}
#maincol {
  position:relative;
  margin:0;
  padding:0px;
}
#leftcol {
  position:relative;
  float:left;
  left:0px;
  width:9px; /* for IE5/WIN */
  voice-family: "\"}\"";
  voice-family:inherit;
  width:9px; /* actual value */
  background:#ECB9E8;
  background:url("../images/tab_tl.jpg") repeat-y top left;
  z-index:100;
  height:53px;
}
#rightcol {
  position:relative;
  float:right;
  right:0px;
  width:9px; /* for IE5/WIN */
  voice-family: "\"}\"";
  voice-family:inherit;
  width:9px; /* actual value */
  background:#D7C4FA;
  background:url("../images/tab_tr.jpg") repeat-y top right;
  z-index:99;
  height:53px;
}
```

APPENDIX C-continued

Cascading Style Sheet with Repetition Behavior

```
#centercol {
  position:relative;
  padding:0 0px;
  height:53px;
  background:url("../images/tab_tm.jpg") repeat;
}
#leftcol2 {
  position:relative;
  float:left;
  width:9px; /* for IE5/WIN */
  voice-family: "\"}\"";
  voice-family:inherit;
  width:9px; /* actual value */
  height:12px;
  background:#ECB9E8;
  background:url("../images/tab_bl.jpg") repeat-y top right;
  z-index:102;
}
#rightcol2 {
  position:relative;
  float:right;
  width:9px; /* for IE5/WIN */
  voice-family: "\"}\"";
  voice-family:inherit;
  width:9px; /* actual value */
  background:#D7C4FA;
  height:12px;
  background:url("../images/tab_br.jpg") repeat-y top right;
  z-index:101;
}
#centercol2 {
  position:relative;
  background:url("../images/tab_bm.jpg") repeat;
  height:12px;
}
#leftcol1 {
  position:relative;
  float:left;
  width:9px; /* for IE5/WIN */
  voice-family: "\"}\"";
  voice-family:inherit;
  width:9px; /* actual value */
  z-index:84;
}
#rightcol1 {
  position:relative;
  float:right;
  width:9px; /* for IE5/WIN */
  voice-family: "\"}\"";
  voice-family:inherit;
  width:9px; /* actual value */
  z-index:83;
}
#centercol1 {
  position:relative; background:#ECB9E8;padding:10px;
}
#centercol a {
  color:#666;
}
#centercol a:hover {
  border-bottom:1px solid;
  color:#9343B9;
}
```

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art.

An algorithm is here and generally is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method comprising:
  displaying, via a computing apparatus, a graphical user interface, the graphical user interface displaying a visual element;
  defining and providing an overlay over the visual element, the visual overlay comprising:
  a first plurality of horizontal and vertical lines the first plurality of horizontal and vertical lines bounding a perimeter of the visual element; and
  a second plurality of horizontal and vertical lines, the second plurality of horizontal and vertical lines different from the first plurality of horizontal and vertical lines, bounding a plurality of interior regions of the visual element, and intersecting the first plurality of horizontal and vertical lines;
  defining a plurality of slices corresponding to the plurality of interior regions of the visual element and associating a default repetition behavior to each of the plurality of slices;
  receiving a selection of a subset of the .plurality of bounded interior regions of the visual element to select a corresponding subset of the plurality of slices, the subset of slices comprising a second plurality of slices;

receiving a selection of a repetition behavior, and responsive to the selection, associating the repetition behavior with each slice of the subset of slices, the repetition behavior comprising at least one of a horizontal repetition behavior or a vertical repetition behavior;

receiving an input comprising a movement of at least one of the first or second plurality of horizontal or vertical lines input via the overlay and, in response to the input, adjusting a size characteristic of each of a plurality of at least one slices bounded by the at least one moved line; the characteristic comprising a size or position of the slice; and generating code for providing repetition behavior for the visual element based on the plurality of slices, the code configured to cause an application accessing the code to provide the repetition behavior associated with the corresponding slice for each respective region of the visual element when the visual element is resized.

2. The method set forth in claim 1, wherein the code further identifies the respective regions of the visual element.

3. The method set forth in claim 1, wherein the plurality of slices comprises nine rectangular slices.

4. The method set forth in claim 1, wherein at least one of the lines
of the first or second plurality of lines are indicated using a first visual effect when bordering a slice and a second visual effect when not bordering a slice, and wherein selection of a line not bordering a slice adjusts the size of all slices bordered by the line.

5. The method set forth in claim 1, wherein receiving input comprises receiving selection and dragging of a bounded interior region not corresponding to a slice and, in response, adjusting the position of the slices.

6. The method set forth in claim 1, wherein receiving input via the
overlay comprises receiving a double-click on a slice and wherein adjusting a characteristic of at least one slice comprises changing the size of the slice so that it extends across an entire horizontal or vertical extent of the visual element.

7. The method set forth in claim 1, wherein the generated code comprises at least one of hypertext markup language (HTML) and cascading style sheet (CSS) code.

8. A system comprising a processor with access to a computer-readable medium tangibly embodying program components, the program components comprising:
a user interface component configured to present: a visual element; an overlay over the visual element, the visual overlay comprising:
a first plurality of horizontal and vertical lines the first plurality of horizontal and vertical lines configured to bound the visual element; and
a second plurality of horizontal and vertical lines the second plurality of horizontal and vertical lines different from the first plurality of horizontal and vertical lines, bounding a plurality of interior regions of the visual element and intersecting the first plurality of horizontal and vertical lines; define a plurality of slices corresponding to the plurality of interior regions of the visual element and associating a default repetition behavior to each of the plurality of slices;
receive a selection of a subset of the plurality of bounded interior regions of the visual element to select a corresponding subset of the .plurality of slices, the subset of slices comprising a second plurality of slices; and a behavior manager configured to receive a selection of a repetition behavior, and responsive to the selection, associate the repetition behavior with each slice of the subset of slices and receive an input comprising a movement of at least one of the first or second plurality of horizontal or vertical lines to adjust a size characteristic of each of a plurality of slices bounded by the at least one moved line;

wherein the system is configured to store data identifying the bounded interior regions of the visual element and corresponding repetition behavior for the bounded interior regions based on the characteristics of the respective slices of the overlay, wherein the program components further comprise a code generator configured to generate code for providing repetition behavior for the visual element from the stored data, the code providing, for each respective bounded interior region of the visual element, the repetition behavior associated with the corresponding slice.

9. The system set forth in claim 8, wherein the size of at least one slice is configured to be adjusted by adjusting the position of at least one of the lines of the first or second plurality of lines bordering the slice.

10. The system set forth in claim 8, wherein at least one of the lines of the first or second plurality of lines are configured to be indicated using a first visual effect when bordering a slice and a second visual effect when not bordering a slice, and wherein selection of a line not bordering a slice adjusts the size of all slices bordered by the line.

11. A computer readable medium tangibly embodying processor-executable program code, the program code configured to cause the processor to:
display, via a computing apparatus, a graphical user interface configured to display a visual element and to provide an overlay over the visual element, the overlay comprising:
a first plurality of horizontal and vertical lines within the overlay, the first plurality of horizontal and vertical lines bounding the visual element; and
a second plurality of horizontal and vertical lines within the overlay, the second plurality of horizontal and vertical lines different from the first plurality of horizontal and vertical lines, bounding a plurality of interior regions of the visual element and intersecting the first plurality of horizontal and vertical lines;
define a plurality of slices corresponding to the plurality of interior regions of the visual element and associating a default repetition behavior to each of the plurality of slices;
receive a selection of a subset of the plurality of bounded interior regions of the visual element to select a corresponding subset of the plurality of slices, the subset of slices comprising a second plurality of slices;
receive an input comprising a movement of at least one of the first or second plurality of horizontal or vertical lines and, in response to the input, adjust a size characteristic of each of a plurality of slices bounded by the at least one moved line; and
store data identifying regions of the visual element and corresponding repetition behavior based on the characteristics of the respective slices of the overlay, said computer-readable medium further comprising program code for generating code for providing repetition behavior for the visual element based on the stored data, the code providing, for each respective bounded interior region of the visual element, the repetition behavior associated with the corresponding slice.

12. The computer-readable medium set forth in claim 11, further comprising program code for associating a default repetition behavior with each slice by associating no repetition behavior or at least one of a horizontal repetition behavior or a vertical repetition behavior with the slice.

13. The computer-readable medium set forth in claim 11, wherein the overlay comprises nine slices, the slices including four corner slices having a default repetition behavior of no repetition, a top middle and bottom middle slice having a default repetition behavior of horizontal repetition, and a right middle and left middle slice having a default repetition behavior of vertical repetition.

14. The computer-readable medium set forth in claim 11, wherein the graphical user interface is configured to toggle the coverage of a slice between a first region of the visual element and a second region of the visual element in response to a click command provided at the slice.

15. The computer-readable medium set forth in claim 11, wherein the graphical user interface is configured to receive selection and dragging of a bounded interior region not corresponding to a slice and, in response, adjust the position of the slices.

* * * * *